Figure 1:
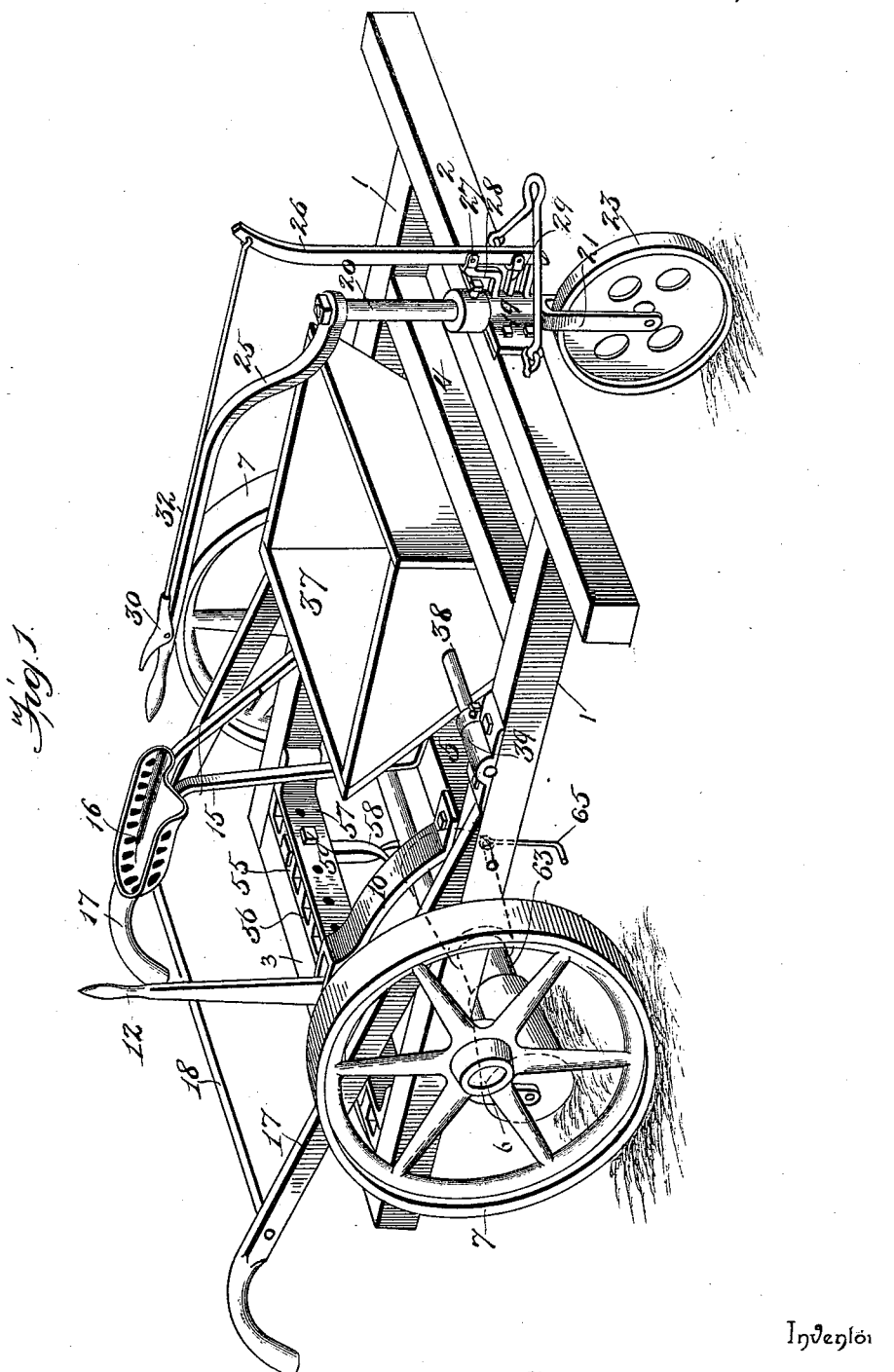

(No Model.) 2 Sheets—Sheet 1.

G. W. MURRAY.
COMBINED COTTON SEED PLANTER AND FERTILIZER DISTRIBUTER.

No. 520,891. Patented June 5, 1894.

Witnesses
John C Shaw
W. S. Duvall

Inventor
George W. Murray.
By his Attorneys,
C A Snow & Co.

THE NATIONAL LITHOGRAPHING COMPANY,
WASHINGTON, D. C.

(No Model.) 2 Sheets—Sheet 2.
G. W. MURRAY.
COMBINED COTTON SEED PLANTER AND FERTILIZER DISTRIBUTER.
No. 520,891. Patented June 5, 1894.
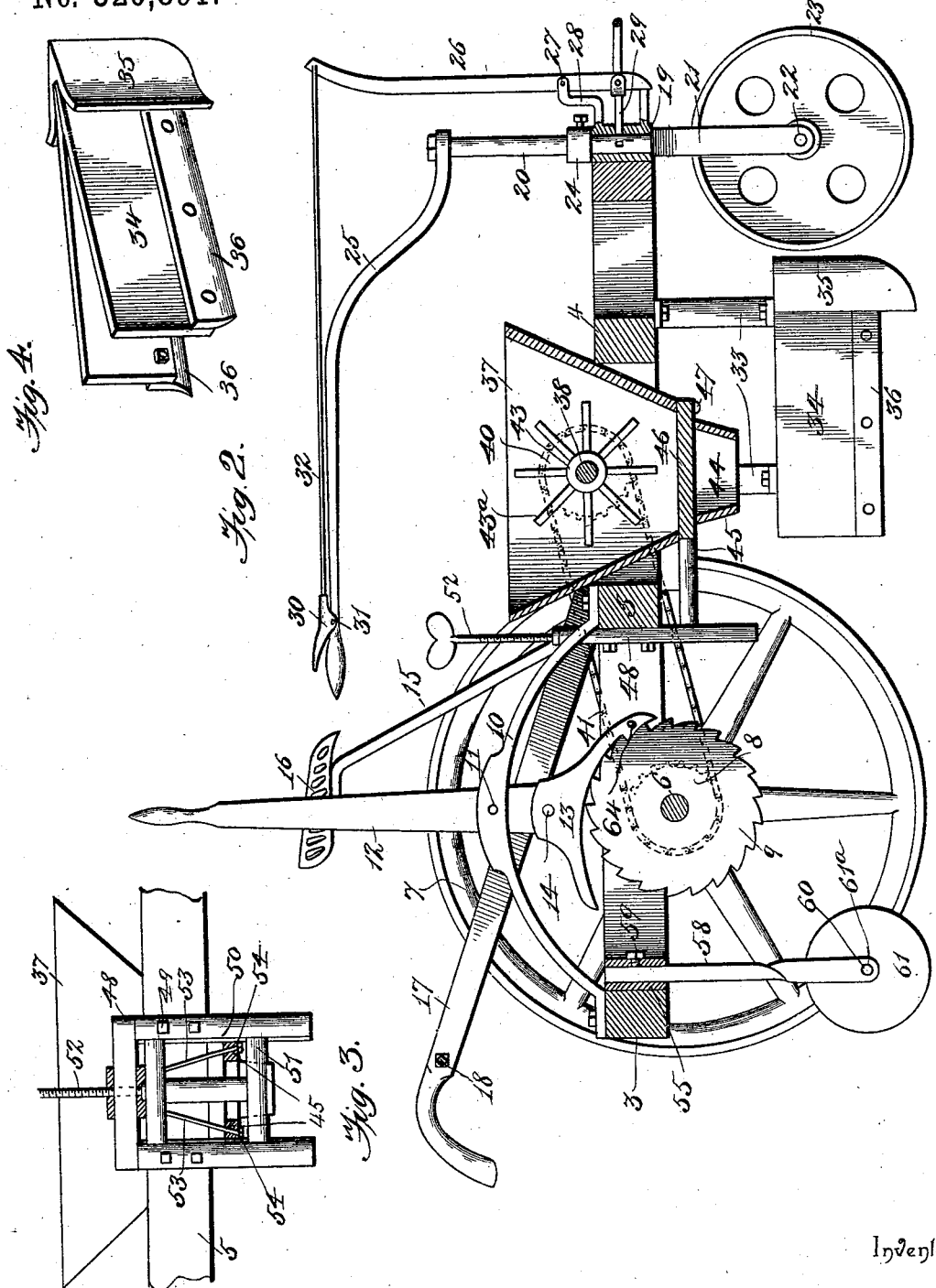
Witnesses
Inventor
George W. Murray
By his Attorneys,
C. A. Snow & Co.

UNITED STATES PATENT OFFICE.

GEORGE W. MURRAY, OF REMBERT, SOUTH CAROLINA.

COMBINED COTTON-SEED PLANTER AND FERTILIZER-DISTRIBUTER.

SPECIFICATION forming part of Letters Patent No. 520,891, dated June 5, 1894.

Application filed September 25, 1893. Serial No. 486,449. (No model.)

*To all whom it may concern:*

Be it known that I, GEORGE W. MURRAY, a citizen of the United States, residing at Rembert, in the county of Sumter and State of South Carolina, have invented a new and useful Combined Cotton-Seed Planter and Fertilizer-Distributer, of which the following is a specification.

My invention relates to improvements in combined fertilizer-distributers and cotton-seed planters; and the objects in view are to construct a machine of cheap, simple, and durable construction, the same being designed to plant cotton-seed in drills for growing the same, or drop the same for fertilizing purposes and leave the soil in condition for future planting.

With these and other objects in view the invention consists in certain features of construction hereinafter specified and particularly pointed out in the claims.

Referring to the drawings:—Figure 1 is a perspective view of a machine embodying my invention. Fig. 2 is a vertical longitudinal sectional view. Fig. 3 is a transverse sectional view in rear of the hopper. Fig. 4 is a detail in perspective of the furrow forming device.

Like numerals of reference indicate like parts in all the figures of the drawings.

In practicing my invention I employ a rectangular framework comprising opposite longitudinal frame-bars 1, front and rear connecting-bars 2 and 3 reepectively, and intermediate transverse connecting bars 4 and 5. A transverse axle 6 is arranged in bearings in the frame-bars 1, and beyond the same has mounted thereon ground-wheels 7. The said axle beyond one of the ground-wheels is provided with a sprocket-wheel 8. Adjacent to the opposite ground-wheel there is arranged upon the axle and secured thereupon a ratchet-wheel 9, the same having arranged thereover an arched standard 10 whose opposite ends rest on the cross-bars 3 and 5. This standard 10 has a mortise or opening at its center, and fulcrumed therein, as at 11, is a hand-lever 12, which projects below the standard and terminates above the ratchet-wheel in a double-toothed pawl 13, which is pivoted by a bolt 14 to the aforesaid lever.

Seat standard 15, is supported by the cross-bar 5 and supports a seat 16 for the accommodation of the driver, within whose reach said lever 12 is located.

Handles 17 may also be mounted on the frame-bars 1 and extend in rear of the framework, said handles being connected by the usual tie-rod 18.

The front end of the frame may be supported in any desirable manner, but in the present instance, I employ a bearing-eye 19, in which I swivel a spindle 20, whose lower end is bifurcated as at 21, and receives the journals 22 of a caster-wheel 23. The eye rests upon the bifurcation 21, and a collar 24 arranged upon the spindle serves to confine the eye upon the shoulder of the bifurcation. The upper end of the spindle is provided with a handle 25 by means of which the caster-wheel may be operated. Numerous means may be devised for securing the caster-wheel at any angle to the line of draft, but in the present instance I employ a lever 26, which is fulcrumed as at 27 to the bracket-arm 28 that extends from the eye, and below its fulcrum point is provided with a locking-bolt 29 which passes through a perforation in the eye and into any one of a series of teeth or perforations formed in the spindle. The upper end of the lever 26 is connected to a bell-crank hand-lever 30, by means of a wire 32 and said lever 30 is pivoted as at 31 to the handle 25.

Depending from the frame-bars in front of the axle is a pair of hangers 33, and the same are secured to the upper edges of a pair of oppositely and diagonally disposed gage-bars 34 which terminate at their front ends in a meeting point where they are provided with a furrow-opening-shoe or point 35, which extends below the gage-bars and has its front lower end rounded. The shoe is V-shaped to conform to an angle produced by the bars, and the lower ends of the bars are provided with outwardly flared shear-blades 36.

Arranged between the cross-bars 4 and 5 is the hopper 37 through whose opposite walls passes an agitating-shaft 38, said shaft being journaled in bearings 39 located upon the frame-bars 1, beyond one of which bearings the said shaft extends and is provided with a sprocket-wheel 40 that is operated by the sprocket-wheel 8 through the medium of an intermediate sprocket-chain 41.

A hub 43 is arranged upon the shaft 38, and radiating from this hub is a series of stirring-fingers or arms 43ª, the same being located within the hopper.

A spout 44 depends from the bottom of the hopper above the furrow-opening device, and interposed between the spout and the bottom of the hopper is a pair of levers 45, which at their inner sides carry the opposite halves of a cut-off 46. These levers are pivoted at their front ends as at 47, so that they may be opened and spread at their rear ends and thus cause an opening of the cut-offs.

An inverted U-shaped frame 48 is located at the rear side of the cross-bar 5, and is bolted thereto, as indicated at 49. The opposite vertical terminals of this frame are at their inner sides grooved, as shown in Fig. 3, at 50, and arranged in these grooves for vertical movement are the opposite tenoned ends of an H-shaped frame 51.

The upper cross-piece of the frame 48 is bored vertically, and a screw 52 is arranged in the bore of the cross-piece and engages with the upper side of the frame 51, whereby, as will be obvious, through the medium of the set-screw the frame 51 may be adjusted within the frame 48. The upper and lower sides or cross-bars of the frame 51 are provided with inclined guide-rods 53 whose upper ends converge, and these rods operate loosely in perforations 54 formed in the rear ends of the bars 45, so that by raising and lowering the H-shaped frame 51 through the medium of the adjusting-screw it will be obvious that the bars are spread and contracted and consequently the cut-offs likewise opened and closed, and thus the amount of cotton-seed discharged is regulated.

To the front face of the rear cross-bar 3 there is secured a metal bar 55, the same being provided with a series of vertical recesses 56, and in advance of this cross-bar a clamping-bar 57 is located, the ends of the clamping-bar being bolted to the frame-bars 1, as shown. A pair of standards 58 is arranged in the vertical recesses 56, and binding-screws 59 are arranged in perforations formed in the bar 57 opposite the recesses 56 occupied by the standards 58 and impinge upon the latter serving to adjustably maintain them in position. The lower ends of these standards 58 are provided with bearings 60, and they receive the journals 61ª of a roller 61. The periphery of the roller is concaved inwardly as shown, and at its center an annular groove 63 is formed.

This completes the construction of the machine and the operation is as follows:—The machine being drawn along a field, the furrow-opener at the front end thereof which follows the caster forms a furrow in the soil. The cotton-seed contained within the hopper is under a constant state of agitation and is therefore caused to feed through the opening between the cut-offs in the desired quantity, and falling between the angularly disposed gage-bars 34 is deposited in the bottom of the furrow thus formed. Immediately thereafter the roller operates upon the soil so as to bed the same, forcing it toward the furrow over the cotton, and finally the annular groove 63 serves to form a drill clearly defined in the soil and indicating the presence of the fertilizing cotton-seed. The cotton-seed as is well known, is a cheap as well as an efficient fertilizing agent, and in a short time rots and enriches the soil, so that the drill is in condition to receive seed of various kinds.

Through the medium of the lever 12 and its pawl 13 it will be seen that the machine may be backed to go over any portion that might be missed, or for any other reason desired.

The weighted end of the pawl 13 has an eye 64, which may be engaged with a hook 65, whereby the said pawl is maintained out of operative engagement with the ratchet-wheel.

Certain novel features shown and described in this application are claimed in applications pending at the same time and numbered 480,931 and 485,611, respectively.

I do not limit my invention to the precise details of construction herein shown and described, but hold that I may vary the same to any degree and extent within the knowledge of the skilled mechanic.

Having described my invention, what I claim is—

1. In a machine of the class described, the combination with the framework, and the fertilizer distributing-mechanism, of a roller arranged thereunder and having a concaved periphery gradually reduced toward the center and provided at its center with an annular cylindrical recess, a superimposed notched bar, standards extending from the ends of the roller and forming bearings for its journals and arranged in the notches of the bar, a clamping-plate arranged in front of the bar, and binding-screws passed through the clamping-plate and bearing upon the standards, substantially as specified.

2. In a machine of the class described, the combination with a framework and a fertilizing-mechanism, of a rear axle, ground-wheels thereon, a ratchet-wheel arranged upon the axle, an arched standard arranged over the axle, a lever fulcrumed in the arched standard, a pawl weighted at one end to normally engage the ratchet-wheel, an eye on the pawl and a hook on the framework for engaging the eye for suspending the pawl out of operative position, substantially as specified.

3. In a machine of the class described, the combination with a framework, a fertilizer dropping mechanism, a pair of forwardly converged gage-bars arranged below the said mechanism, and a furrow-opening shoe attached to and conforming with the angle at the meeting ends of the gage-bars and having a rounded lower edge which depends below the lower edges of the gage-bars, of horizontally flared shear-blades 36 secured to the outer sides of the gage-bars with their flared lower edges extending below the plane of the lower edges of the gage-bars and terminating at their front ends in rear of said shoe, substantially as specified.

4. In a machine of the class described, the combination with a rectangular framework, and the furrow-opening devices arranged therebelow, of the superimposed hopper, the agitator arranged therein, a pair of bars pivoted at their front ends at opposite sides of the opening in the bottom of the hopper, cut-offs carried by the bars, opposite vertical ways arranged in rear of the hopper, a sliding frame arranged in the ways, inclined rods arranged upon the sliding frame and passing through perforations in the bars, substantially as specified.

5. In a machine of the class described, the combination with a rectangular framework, and the furrow opening devices arranged therebelow, of the superimposed hopper the agitator arranged therein, a pair of bars pivoted at their front ends at opposite sides of the opening in the bottom of the hopper, cut-offs carried by the bars, an inverted U-shaped frame arranged in rear of the hopper and provided with grooves at the inner side of its vertical terminal, an H-shaped frame having its ends tenoned to enter the groove, inclined rods converging toward their upper ends arranged in the H-shaped frame and passing through openings in the rear ends of the bars, and an adjusting-screw connected to the H-shaped frame and passing through the upper end of the guide-frame, substantially as specified.

In testimony that I claim the foregoing as my own I have hereto affixed my signature in the presence of two witnesses.

GEORGE W. MURRAY.

Witnesses:
  E. G. SIGGERS,
  W. S. DUVALL.